July 1, 1924.

J. S. LANG

SHOCK ABSORBER

Filed Aug. 22, 1922

1,499,379

INVENTOR:
James S. Lang
BY Coale Thayer
ATTORNEYS:

Patented July 1, 1924.

1,499,379

UNITED STATES PATENT OFFICE.

JAMES S. LANG, OF WATERTOWN, MASSACHUSETTS.

SHOCK ABSORBER.

Application filed August 22, 1922. Serial No. 583,473.

*To all whom it may concern:*

Be it known that I, JAMES S. LANG, of Watertown, in the county of Middlesex and State of Massachusetts, a citizen of the United States, have invented a new and useful Improvement in Shock Absorbers, of which the following is a full, clear, and exact description, reference being had to the accompanying drawings, forming a part of this specification, in explaining its nature.

The present invention belongs to that class of shock absorbers which are especially adapted for motor vehicles, and in which the force required to pass a fluid through a constricted opening is utilized to prevent excessive vibration or rebound.

The object of the invention is to provide a generally improved shock absorber, capable of silent action, having adequate provision against the leakage of fluid, and composed of relatively few parts.

The invention can best be seen and understood by reference to the drawings in which a shock absorber embodying the invention is shown, and in which:—

Referring to the drawings:—

Figure 1:
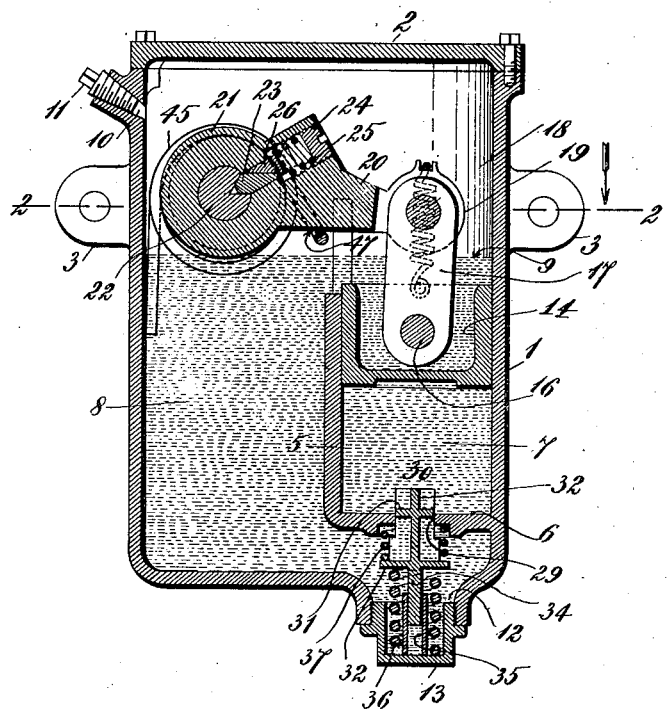
Figure 1 is a medial vertical cross section.

1 represents a casing having a removable cover 2. Projecting laterally from the casing are lugs or ears 3, by which it may be secured to the body or framework of a vehicle. On the inside the casing is provided with spaced bearings 4, for a rock shaft later to be referred to. The interior of the casing is also provided with interior partitions 5 and 6, which provide within it a compression chamber 7, and outside this chamber immediately adjacent thereto a secondary or expansion chamber 8, with an opening between the two chambers.

The casing forms a receptacle for oil or other fluid contained within its respective chambers and maintained at about the level 9. Oil is introduced into the casing at the top by way of the inlet 10, closed by the filling plug 11. At the bottom the casing is provided with an outlet opening 12, closed by the plug 13. This opening provides an outlet for the oil and an opening through which the parts above may be machined, and through which certain of the working parts may be introduced into the casing.

The compression chamber 7 is within a cylinder formed by the co-operation of the wall or partition 5 with the walls of the casing. Contained to reciprocate within the cylinder is a piston 14. The piston is provided with interior cheeks 15 within which a pin 16 is fixed to cross the space between the cheeks. Pivotally secured to the pin is a link 17 which is also pivotally secured to a pin 18 fixed in the spaced ends 19 of a rocker arm 20. The rocker arm 20 is provided with a hub 21 secured to a rock shaft 22 which turns within the spaced bearings 4 in the casing above referred to, the hub 21 occupying the space between the bearings. The hub 21 is fastened upon the shaft 22 by means of a key 23 which is held tightly into its keyway by the pressure exerted by a plug 24 upon a spring 25 and wedge 26.

Either keyed upon the outward end of the shaft 22 or constructed integrally therewith is an external rocker arm 27 provided with a ball 28 for making a ball and socket connection with any suitable means (not shown) for connecting it to the axle of the vehicle.

With this arrangement of parts it will be seen that any change in the relative positions of the axle or vehicle frame or body due to inequalities in the roadway, will act to move the piston 14, which is raised or lowered in the cylinder as the case may be.

Referring now to the means of controlling the passage of fluid between the compression chamber 7 and the secondary or expansion chamber 8. The partition 6 in the casing closes the lower end of the cylinder forming the bottom wall of the compression chamber 7. Within the partition 6 at the lower end of the cylinder is located an opening 29 controlled by the valve 30, shown in Fig. 1 in its normal closed position. The valve 30 carries near its upper end a circular disc or piston 31 which fits the hole 29 with a close sliding fit, and is guided with reference to hole 29 by guiding fins 32. At the lower termination of the guiding fins the valve carries a spring seating 33, below which extends a cylindrical valve spindle 34 which enters a guide sleeve 35 fixed to interior of plug 13. Interposed between the spring seating 33 and the hollow plug 13 is a relatively heavy spring 36, and interposed between the spring seating and the lower side of partition 6 is a considerably lighter spring 37. The valve is movable axially, being held in position by the guiding fins 32 above and the spindle 34 and the guiding sleeve 35 below. In its normal state the valve occupies the position shown in Fig. 1 supported by the spring seating 33 resting upon spring 36 which on account of its greater stiffness is only very slightly compressed from its normal free state by the weight of the valve 30 and the pressure exerted by the lighter spring 37. In this position the hole 29 in the partition 6 is closed by the disc 31 shutting off communication between the compression chamber 7 and the secondary chamber 8.

Figure 3:
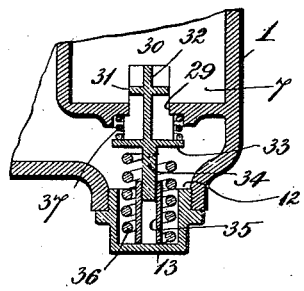
Fig. 3 is a section of the combination inlet and relief valve in its upper open position and the adjacent parts.

If now the piston 14 be raised in the cylinder there will result an excess of pressure in the chamber 8 over that in the chamber 7 which acting on the under side of the disk 31 will raise the valve compressing spring 37 as shown in Fig. 3. In the position shown in Fig. 3 a path for the transfer of fluid from chamber 8 to chamber 7 is opened, the fluid passing through the hole 29 between the guiding fins 32, and between the lower edge of disc 31 and the upper edge of the hole in partition 6. As shown the spring seating 33 may leave contact with the stiff spring 36 if desired. As the spring 37 is of only sufficient stiffness to overcome the inertia of the valve 30 and return it to its normal position quickly, the flow of fluid from chamber 8 to chamber 7 takes place with very little resistance. By sacrificing somewhat the quickness of action of the valve the spring 37 may obviously be dispensed with. When the upward movement of the piston ceases an equality of pressures in chambers 7 and 8 will be established, and the valve will be returned by pressure of spring 37 and gravity to its normal position shown in Fig. 1.

Figure 4:
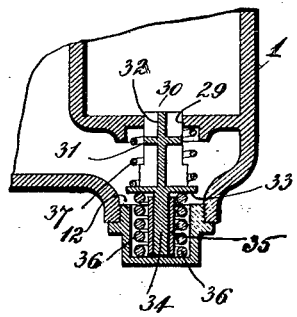
Fig. 4 is a section of the combination inlet and relief valve in its lower open position and the adjacent parts.
Figure 2:
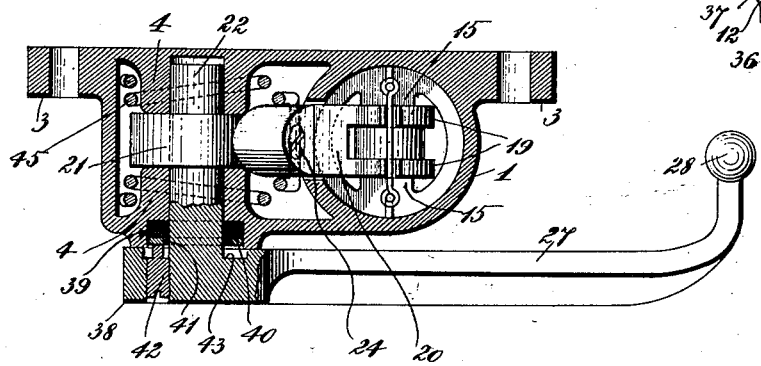
Fig. 2 is a horizontal section on the line 2—2 of Fig. 1.

If the piston now moves downward in the cylinder an excess of pressure in chamber 7 over that in chamber 8 exerted on the top of disc 31 will depress the valve 30, compressing the heavy spring 36. If the downward movement of the piston be continued a heavy pressure is built up in the cylinder, opposing the downward movement of the piston, until, acting upon the top of the valve, the upper edge of the disc 32 is depressed below the edge of the hole 29 on the under side of partition 6, when an escape of liquid will take place at a pressure corresponding to the tension of the springs as the piston continues its downward movement. This position of the valve is shown in Fig. 4. When the downward movement of the piston ceases the valve regains its normal closed position.

It is therefore seen that the valve 30 operates as a check valve opening under light pressure into the chamber 7 when in its raised position, and also operates as a relief valve, opening under heavy pressure from chamber 7 when in its depressed position.

The hub 38 carrying the rocker arm 27 is either keyed upon or constructed integrally with the rock shaft 22 extending within the casing 1. To prevent the oil or other fluid from leaking along the shaft 22 and escaping, the side of the casing is provided with a packing gland 39, filled with a suitable packing 40. A packing retaining ring 41 is held against the packing by pressure of screws 42, preferably three in number, threaded in hub 38 and spaced equally about the axis of shaft 22. The inner side of the hub 38 is provided with an annular groove or recess 43 sufficiently large to receive the ring 41 when the pressure screws 42 are retracted.

In operation the gland 39 is completely filled with packing, the ring 41 occupying the recess 43, after which the equally spaced pressure screws are tightened pressing the ring 41 against the packing sufficiently to prevent leakage. As the packing becomes worn through use and a tendency to leak develops, the pressure screws 42 are again tightened to counteract that tendency. As the hub 38 moves with respect to the casing 1 the ends of the screws 42 slide upon the side of ring 41 or the latter rotates upon the packing in the gland 39 according to the relative friction of the parts.

To prevent rattling of the shaft 22 within its bearings 4, 4, as a result of wear the shaft is kept in constant contact with the upper side of the bearings by means of a spring 45 which encircles each one of the bearings 4, 4, with one or more turns. The middle portion of the spring 45 passes under and bears upward against the rocker arm 20 as shown at 46, while the ends of the spring press against the inside of the casing at 47. The effect of the tension of spring 45 is therefore not only to keep the shaft 22 in contact with the upper side of the bearings 4, but also to raise the rocker arm 27 and to keep under tension the connection between the outer end of the rocker arm 27 and the axle of the vehicle. The connection between the outer end of the rocker arm 27 and the axle of the vehicle may therefore be any suitable flexibly connected rigid bar or a flexible strap as desired. In assembling the spring is sprung into place before the insertion of rockshaft and rocker arm.

The operation of the shock absorber is as follows:

The absorber casing is attached by means of the lugs 3 to the body of a vehicle, and the end of the rocker arm 27 is attached by a suitable connection to the axle of the vehicle. It will now be assumed that all the parts of the absorber are in a normal position, the piston occupying a position about midway of the cylinder, and that the vehicle with its axle in normal relation to the body encounters a raised obstruction in the roadway having an abrupt rise succeeded by a corresponding decline and of sufficient height and width under ordinary circumstances to produce a violent rebound. As the wheels mount the rise the axle is brought nearer to the body of the vehicle body on account of the inertia of the body, compressing the vehicle springs. Simultaneously with the rise of the axle the hub 21 is turned lifting the rocker arm 20, which raises the piston in the cylinder, and oil is drawn into the compression chamber below the piston from the secondary chamber, by way of valve 30 raised to an open position against the light pressure of the spring 37. The relatively free passage of the fluid from the secondary chamber 8 to the pressure chamber 7 allows the vehicle springs to be thus compressed without undue interference by the absorber. If, as assumed above, the approach is quite abrupt followed by an immediate decline, the inertia of the vehicle body will prevent its appreciable rise until the wheels have reached the top of the obstruction, when an incipient rebound will begin. The vehicle body then rises slightly above its former line of travel, and simultaneously the axle begins to move away from the body as the wheels pass the horizontal crown of the rise, moving the piston downward in the cylinder.

Unless provided with some other auxiliary bypass however, no discharge of fluid can take place from the pressure chamber into the secondary chamber until the pressure has risen sufficiently to depress the valve 30 against the pressure of the heavy spring 36 to its lower opening position, when discharge will take place, the piston encountering, in its descent, a resistance dependent upon the force exerted by the valve springs. The resistance thus encountered by the piston, in its descent, transmitted through rock shaft and rocker arms and connections, keeps the vehicle spring from expanding with undue violence, thus preventing the rebound which would have otherwise occurred.

The strength and stiffness of the spring 36 is obviously made approximately commensurate with the weights of the vehicles to be controlled.

I claim:

1. In a fluid check shock absorber for controlling the movement of relatively movable parts, the combination comprising an element attachable to one of said parts and having a pressure chamber, said element being provided also with a port permitting of the circulation of a contained fluid into and out of said chamber, a piston attachable to the other of said parts and reciprocable in said pressure chamber, a valve for controlling said port, and means for arranging and supporting said valve whereby it may close said port or pass therethrough and open in reverse directions and permit of a more free passage of fluid through said port in one direction than in a reverse direction.

2. In a fluid check shock absorber for controlling the movement of relatively movable parts, the combination comprising an element attachable to one of said parts and having a pressure chamber, said element being provided also with a port permitting of the circulation of a contained fluid into and out of said chamber, a piston attachable to the other of said parts and reciprocable in said pressure chamber, a valve for controlling said port, and means for arranging and supporting said valve whereby it may close said port or pass therethrough and open in reverse directions and permit of a more free passage of fluid into said pressure chamber than out of said chamber.

3. In a fluid check shock absorber for controlling the movement of relatively movable parts, the combination comprising an element attachable to one of said parts and having a pressure chamber, said element being provided also with a port permitting of the circulation of a contained fluid into and out of said chamber, a piston attachable to the other of said parts and reciprocable in said pressure chamber, a valve for controlling said port and means for arranging and supporting said valve whereby it may close said port or pass therethrough and open in reverse directions permitting of a free passage of the fluid into said chamber as the piston moves in one direction and of a passage of the fluid out of the pressure chamber on the reverse movement of the piston only when the fluid has been compressed by the piston in a determinate amount.

4. In a fluid check shock absorber for controlling the movement of relatively movable parts, the combination comprising an element attachable to one of said parts and having a pressure chamber, said element being provided also with a port permitting of the circulation of a contained fluid into and out of said chamber, a piston attachable to the other of said parts and reciprocable in said pressure chamber, a valve for controlling said port, said valve having a head movable through said port in reverse directions and closing said port when contained therein, and means for arranging and supporting said valve whereby the head thereof may open in said pressure chamber permitting of a free entry of fluid into said chamber when the piston moves in one direction and opening outwardly permitting of a passage of fluid out of said chamber on a reverse movement of the piston only when the fluid within the pressure chamber has been compressed by the piston in a determinate amount.

5. In a fluid check shock absorber for controlling the movement of relatively movable parts, the combination comprising an element attachable to one of said parts and having a pressure chamber, said element being provided also with a port permitting of the circulation of a contained fluid into and out of said chamber, a piston attachable to the other of said parts and reciprocable in said pressure chamber, and a valve controlling said port, said valve having a valve body and a head normally arranged to lie within and close said port and movable through said port to open outwardly therefrom in reverse directions, means for guiding the valve and means for yieldingly supporting the valve whereby the head may normally lie within the port as aforesaid, and whereby also the head may freely open into said pressure chamber permitting of a free passage of fluid thereinto as the piston moves in one direction and opening in a reverse direction permitting of the passage of fluid out of said pressure chamber on a reverse movement of the piston only when the fluid within the pressure chamber has been compressed by the piston in a determinate amount.

6. In a fluid check shock absorber, a fluid-containing casing and a rock shaft journaled to turn in bearings on said casing and extending through the side of the casing, a rocker arm outside the casing connected to said shaft, said casing having a packing gland on the side thereof and through which gland the shaft extends, a packing in said gland, a follower, and means for applying pressure to said follower for compressing the packing around said shaft.

7. In a fluid check shock absorber, a fluid-containing casing and a rock shaft journaled to turn in bearings on said casing and extending through the side of the casing, a rocker arm outside the casing with an interposed hub between said arm and shaft, a packing gland on the side of the casing and through which gland the shaft extends, a packing in said gland, a packing ring, and adjustable pressure members contained within said hub and bearing against said ring for compressing the packing within the gland around said shaft.

8. In a fluid check shock absorber, a fluid-containing casing and a rock shaft journaled to turn in bearings on said casing and extending through the side of the casing, a rocker arm outside the casing with an interposed hub between said arm and shaft, said hub being provided on the inside thereof facing said casing with a recess, said casing having a packing gland in the side thereof opposite said recess in the hub and through which gland the shaft extends, a packing in said gland, a packing ring, and press screws passed through said recess in the hub and bearing against said packing ring.

9. In a fluid check shock absorber for controlling the movement of relatively movable parts, the combination comprising an element attachable to one of said parts and having within it a pressure chamber and outside this chamber a secondary chamber, a piston reciprocable within the pressure chamber and attachable to the other of said parts, a flexible mechanism connecting said piston with the said other of the parts and having a rocker arm and rock shaft, said casing being provided with bearings for said shaft, and a spring contained in said secondary chamber and extending in part beneath said rocker arm for raising said rock shaft against the upper side of said bearings and said piston within said pressure chamber.

JAMES S. LANG.